(12) United States Patent
Sanders et al.

(10) Patent No.: US 10,006,303 B2
(45) Date of Patent: Jun. 26, 2018

(54) CONTRA-FLOW STRIPS, CONTRA-FLOW SEAL SEGMENTS, AND METHODS FOR INHIBITING LEAKAGE

(71) Applicants: William P. Sanders, Richmond Hill (CA); Anthony F. Mitola, Saratog Springs, NY (US)

(72) Inventors: William P. Sanders, Richmond Hill (CA); Anthony F. Mitola, Saratog Springs, NY (US)

( * ) Notice: Subject to any disclaimer, the term of this patent is extended or adjusted under 35 U.S.C. 154(b) by 0 days. days.

(21) Appl. No.: 15/487,844

(22) Filed: Apr. 14, 2017

(65) Prior Publication Data

US 2017/0298754 A1    Oct. 19, 2017

Related U.S. Application Data

(60) Provisional application No. 62/323,328, filed on Apr. 15, 2016.

(51) Int. Cl.
| | |
|---|---|
| *F04D 29/08* | (2006.01) |
| *F01D 11/00* | (2006.01) |
| *F01D 11/02* | (2006.01) |
| *F04D 29/16* | (2006.01) |

(52) U.S. Cl.
CPC ............ *F01D 11/001* (2013.01); *F01D 11/02* (2013.01); *F04D 29/083* (2013.01); *F04D 29/164* (2013.01); *F05D 2250/182* (2013.01); *F05D 2250/184* (2013.01)

(58) Field of Classification Search
CPC . F01D 11/10; F01D 5/02; F01D 9/041; F04D 29/321; F04D 29/542; F05D 2300/60; F16J 15/442; F16J 15/4472; F16J 15/4476
See application file for complete search history.

(56) References Cited

U.S. PATENT DOCUMENTS 5,271,712 A * 12/1993 Brandon ................. F01D 11/08
                                                               277/423
5,599,026 A      2/1997 Sanders et al.
5,704,614 A      1/1998 Sanders et al.
(Continued)

FOREIGN PATENT DOCUMENTS

JP        2000227005 A  *  8/2000  .............. F01D 11/08

OTHER PUBLICATIONS

William P. Sanders, Lewis Shuster, and Greg A. Clark, Experience With the Performance Upgrading of Existing Turbine Generator Units on the TVA System, 13-pages, paper presented at PowerGen 2000, Nov. 12 to 16, 2000, Orlando, Florida.

(Continued)

*Primary Examiner* — Gilbert Y Lee
(74) *Attorney, Agent, or Firm* — Heslin Rothenberg Farley and Mesiti PC

(57) ABSTRACT

A contra-flow strip for inhibiting leakage of a fluid between a rotating member and a stationary member includes, for example, a base supportable by the stationary member coaxially around the rotating member, and means, extending from the base coaxially towards the rotating member between a low pressure region and a high pressure region, for generating a contra flow of a portion of a tangential flow of fluid in the low pressure region to the high pressure region between the stationary member and the rotating member.

16 Claims, 8 Drawing Sheets

(56) References Cited

U.S. PATENT DOCUMENTS

| | | | |
|---|---|---|---|
| 5,735,667 A | 4/1998 | Sanders | |
| 2012/0027573 A1* | 2/2012 | Ali | F01D 5/225 415/173.1 |
| 2016/0024954 A1* | 1/2016 | Zheng | F01D 11/02 415/174.5 |
| 2017/0370237 A1* | 12/2017 | Kuwamura | F01D 11/001 |

OTHER PUBLICATIONS

William P. Sanders, Anthony F Mitola, and Kenny R. Noonan, Realizing the Production Benefits of Seal Economics in Outage Execution, 29-pages, at least as early as 2000.

* cited by examiner

CONTRA-FLOW STRIPS, CONTRA-FLOW SEAL SEGMENTS, AND METHODS FOR INHIBITING LEAKAGE

CLAIM TO PRIORITY

This application claims the benefit of U.S. Provisional Application No. 62/323,328, filed Apr. 15, 2016, entitled "Contra-Flow Strips, Contra-Flow Seal Segments, And Methods For Inhibiting Leakage," which application is hereby incorporated herein in its entirety by reference.

FIELD OF THE DISCLOSURE

The present disclosure relates generally to seals, and more particularly to contra-flow strips, contra-flow seal segments, and methods for inhibiting fluid flow between a stationary member and a rotating member such as in a turbine, a compressor, etc.

BACKGROUND

A turbine is a well-known energy conversion apparatus, which is characterized by a rotating member that turns in response to an applied force. Typically, this force is generated by directing a high pressure working fluid such as superheated steam at the rotating member such as a series of blade rows which extend radially from a rotor. The efficiency of the turbine depends upon its ability to maximize the conversion of the working fluid energy into rotation of the rotating member. Sealing devices are therefore employed about the rotating member to contain the working fluid to working spaces within the turbine.

Sealing devices used in turbines are known variously as steam seals, gland seals, labyrinth seals, steam packings, diaphragm packings, and pressure packings. A fundamental component of these seals is a sealing strip. The sealing strip is a ring shaped structure which is typically provided as several arcuate sealing segments. The sealing strip encircles the rotating member and occupies radial space between the rotating member and the turbine casing or other surrounding structure.

FIG. 1 illustrates a seal system 10 having a plurality of simple circumferentially-extending sealing strips 12 arranged radially from a stationary member such as a turbine casing 11, and a series of simple circumferentially-extending sealing strips 14 arranged radially from a stationary member such as a diaphragm 13 to form a small radial clearance between inner surfaces of the sealing strips and a circular surface such as a blade cover band 15 or a rotor 18, respectively, to limit the amount of gas that passes therebetween.

FIG. 2 illustrates a "Vortex Shedder Seal" segment 20, a plurality of which are employed as a sealing strip for reducing the gas pressure ahead of a seal system, and also reduce the pressure differential across the seal system. See U.S. Pat. No. 5,735,667 issued to Sanders et al. As shown in FIG. 2, "Vortex Shedder Seal" segment 20 includes a plurality of spaced apart teeth having a plurality of outwardly-extending portions 28 adjacent to openings between the teeth which extend into a high pressure region to generate turbulence in a tangential fluid flowing as indicated by a curved line R adjacent to the seal strip for producing and shedding vortices in the high pressure fluid to generate reduced pressure adjacent to the seal in the high pressure region. As shown in FIG. 3, another "Vortex Shedder Seal" segment 30 has a plurality of outwardly-extending dimples 38 that extend into a high pressure region to generate turbulence in the high pressure tangential fluid flowing as indicated by a curved line R adjacent to the seal for producing and shedding vortices in the high pressure fluid to generate reduced pressure adjacent to the seal in the high pressure region. For example, the producing and shedding of vortices increases kinetic energy of the working fluid which reduces the pressure of the working fluid in front of the vortex shedder seal.

Additional background information may be found in Sanders, Turbine Steam Path Engineering for Operations & Maintenance Staff, 1988, the entire contents of which are incorporated herein by reference.

SUMMARY

Shortcomings of the prior art are overcome and additional advantages are provided through the provision, in one embodiment, of a contra-flow strip for use in inhibiting leakage of a fluid between a rotating member and a stationary member. The contra-flow strip includes, for example, a base supportable by the stationary member coaxially around the rotating member, and means, extending from the base coaxially towards the rotating member between a low pressure region and a high pressure region, for generating a contra flow of a portion of a tangential flow of fluid in the low pressure region to the high pressure region between the stationary member and the rotating member.

In another embodiment, a contra-flow seal segment for use in inhibiting leakage of a fluid between a rotating member and a stationary member is provided. The contra-flow seal segment includes, for example, a base portion operably supportable from the stationary member, and means, extendable from the base portion towards the rotating member between a low pressure region and a high pressure region, for generating a contra flow of a portion of a tangential flow of fluid in the low pressure region to the high pressure region between the stationary member and the rotating member.

In another embodiment, a contra-flow strip segment for use in inhibiting leakage of a fluid between a rotating member and a stationary member is provided. The contra-flow strip segment includes, for example, a base portion operably supportable from the stationary member, a discontinuous portion extendable from the base portion towards the rotating member between a low pressure region and a high pressure region. The discontinuous portion includes at least one first deflecting portion operable to direct a portion of a tangential flow of fluid in the low pressure region through at least one passageway in the discontinuous portion to the high pressure region. The contra-flow strip segment further includes the discontinuous portion comprises at least one second deflecting portion operable to direct a tangential flow of fluid in the high pressure region away from the at least one passageway in the discontinuous portion, and/or a sealing strip portion extendable from the base portion to define a channel portion between the discontinuous portion, the sealing strip portion, the base portion, and a portion of the rotating member. The channel portion is operable for containing the low pressure region, and the at least one first deflecting portion is operable to direct the portion of the tangential flow of fluid in the low pressure region in the channel through the at least one passageway in the discontinuous portion to the high pressure region.

In another embodiment, a method for inhibiting leakage of fluid between a stationary member and a rotating member is provided. The method includes, for example, generating contra-flow from a tangential flow of fluid in a low pressure region through a plurality of passageways to a high pressure region between the stationary member and the rotating member.

In another embodiment, a method for producing a contra-flow strip segment includes, for example, providing a base portion and a discontinuous portion extending from the base portion, forming at least one first portion of the discontinuous portion outwardly from a first side of the discontinuous portion, forming at least one second portion of the discontinuous portion outwardly from a second side of the discontinuous portion, and wherein the at least one first portion and the at least one second portions define at least one passageway therebetween.

BRIEF DESCRIPTION OF THE DRAWINGS

The subject matter which is regarded as the disclosure is particularly pointed out and distinctly claimed in the concluding portion of the specification. The disclosure, however, may best be understood by reference to the following detailed description of various embodiments and the accompanying drawings in which:

DETAILED DESCRIPTION

The present disclosure is directed to contra-flow strips operable to generate a contra flow to return a portion of the working fluid leaking under the contra-flow strip back upstream to the inlet side of the seal system, thereby limiting the amount leakage which will expand through the seal system. For example, the concept of the contra-flow strip is operable to deflect and return a portion of the fluid leaking past a contra-flow strip back "upstream" to a higher pressure region. In one example, this reduces the quantity of gas available to leak past the remaining seal strips, which minimizes or reduces the quantity of gas available to leak, and so increases the amount of gas generating power for example in blade rows. The power loss due to leakage past the seals is directly proportional to the quantity of the leakage past any sealing device. Thus, reducing the total leakage quantity increases the efficiency of, for example, a turbine.

As described in greater detail below, the present disclosure is directed to contra-flow strips and seal systems configured to deflect or generate a return of a portion of downstream leakage of a working fluid between a stationary member and a moving member back upstream. For example, such contra-flow strips and seal allow a portion of a leakage from a high pressure region that passes the contra-flow strip to a lower pressure region to be returned upstream ahead of the contra-flow strip to a higher pressure region. Such seal systems may include a contra-flow strip and a spaced apart sealing strip configured to allow a portion of a leakage from a high pressure region that passes the contra-flow strip and disposed in a lower pressure region in a channel such as an annular channel between the contra-flow strip and the sealing strip to be returned upstream ahead of the contra-flow strip to the higher pressure region. The contra-flow strips and such seal systems of the present disclosure may be employed in a turbine having a stator and a rotor such as a gas turbine, a steam turbine, a compressor, etc., or other types of devices.

Figure 1:
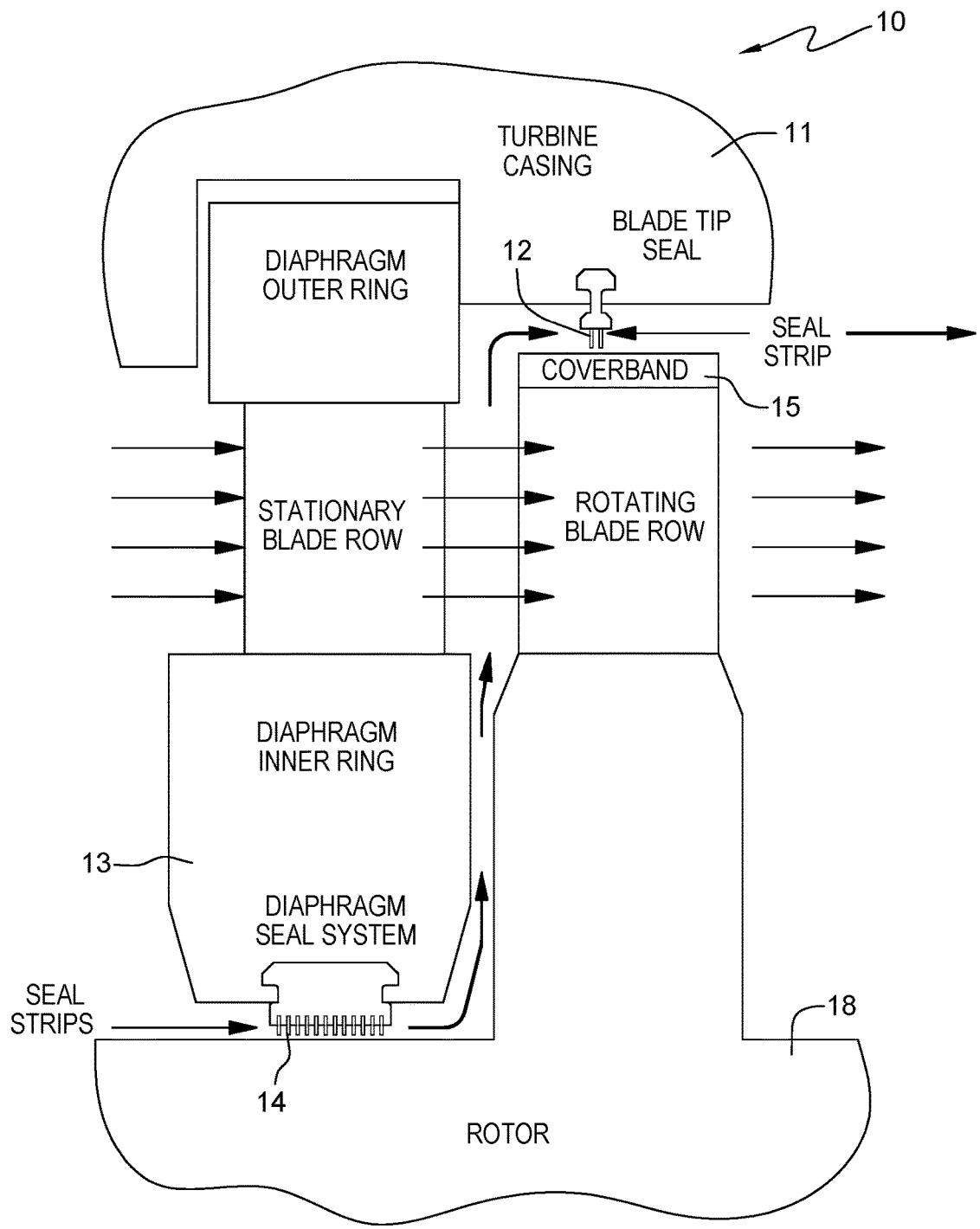
FIG. 1 is a cross-sectional view of a portion of a prior art turbine incorporating conventional sealing strips.
Figure 2:
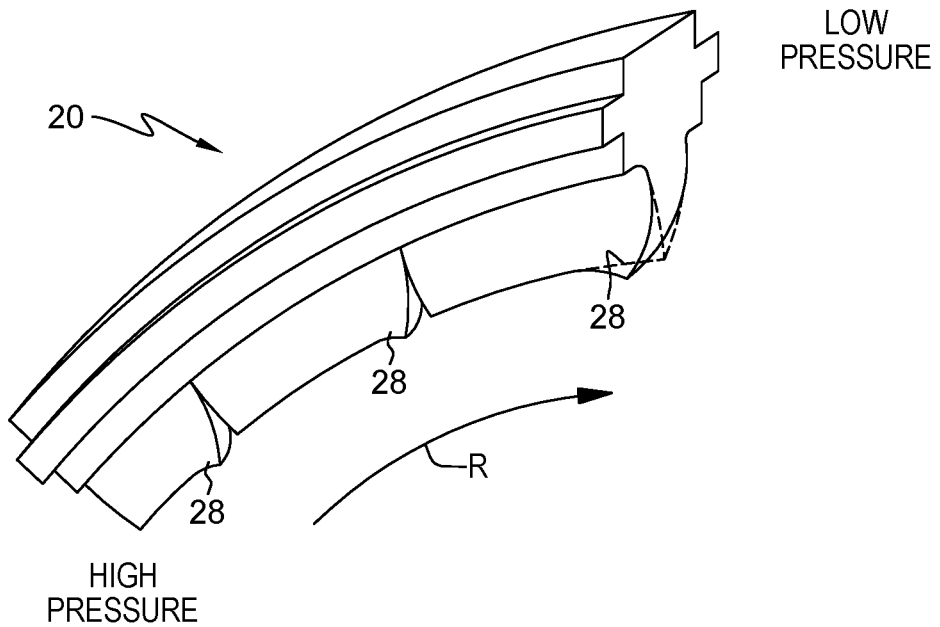
FIG. 2 is a perspective view of a prior art "Vortex Shedder Seal" segment.
Figure 3:
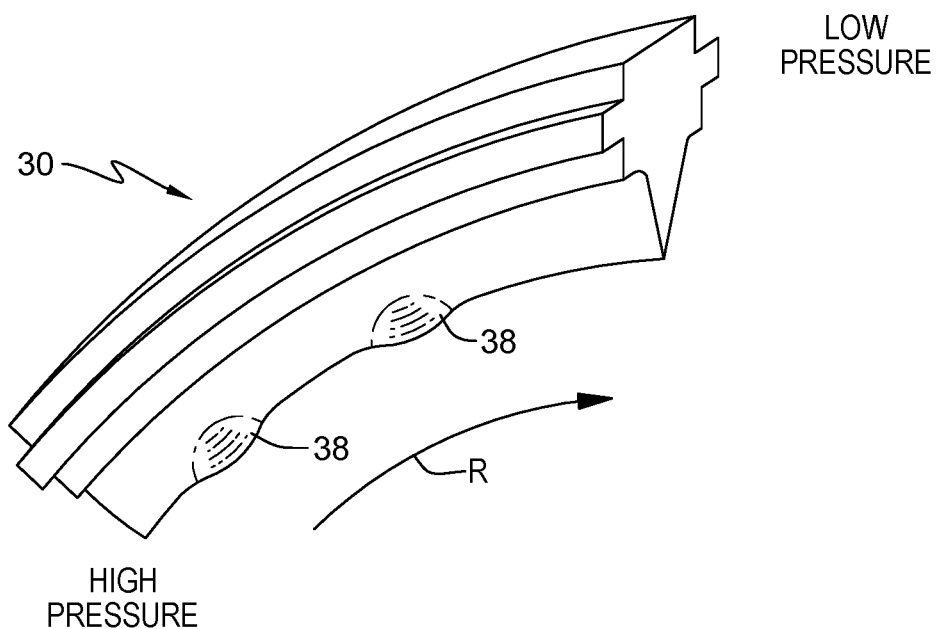
FIG. 3 is a perspective view of another prior art "Vortex Shedder Seal" segment.
Figure 4:
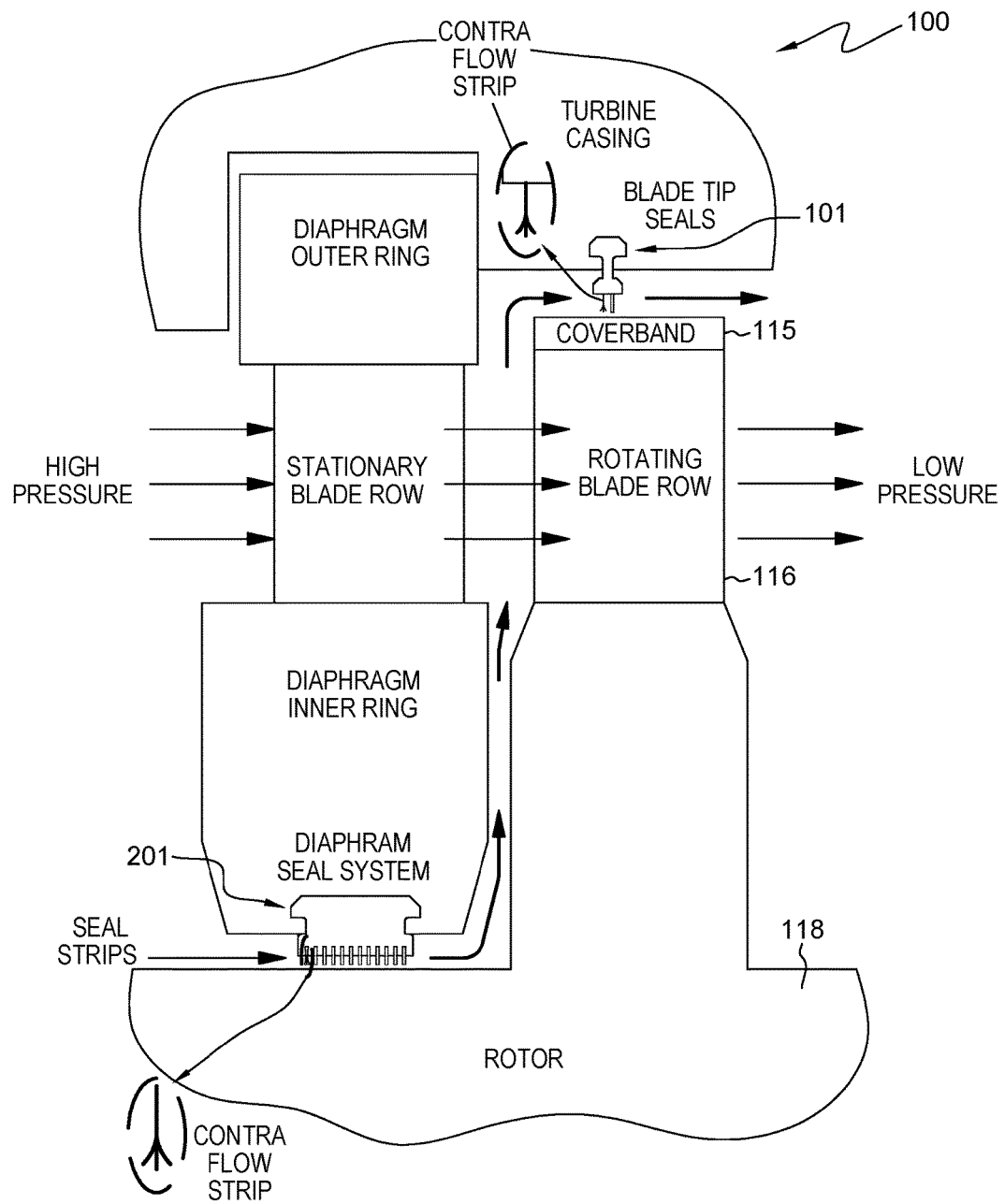
FIG. 4 is a cross-sectional view of a portion of a turbine incorporating a plurality of contra-flow seals according to the present disclosure.

FIG. 4 illustrates a portion of a turbine 100 employing a contra-flow seal 101 according to an embodiment of the present disclosure. Contra-flow seal 101 may be disposed adjacent to a cover band 115 of a blade row 116. In other embodiments, a contra-flow seal 201 according to an embodiment of the present disclosure may be disposed adjacent to a rotor 118.

Figure 5:
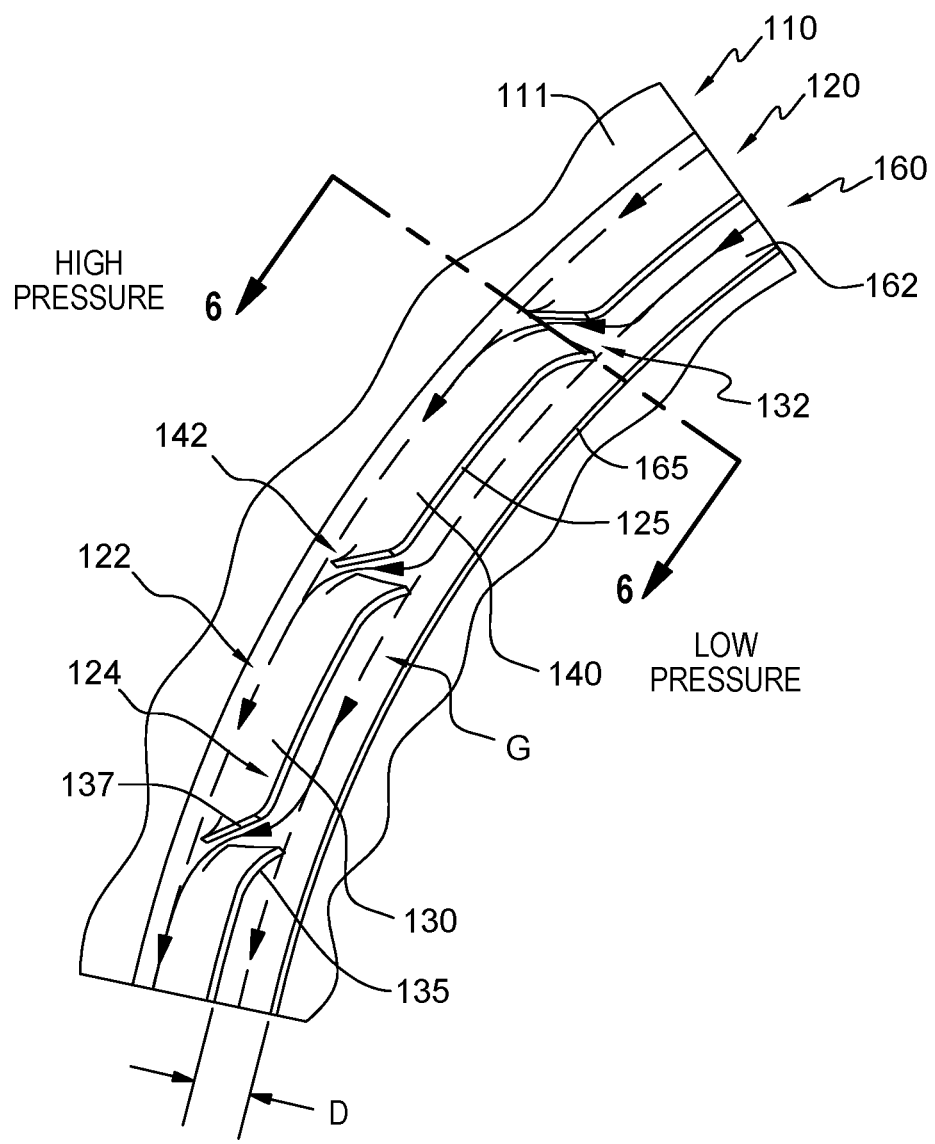
FIG. 5 is an enlarged perspective view of a contra-flow seal segment of FIG. 4.
Figure 6:
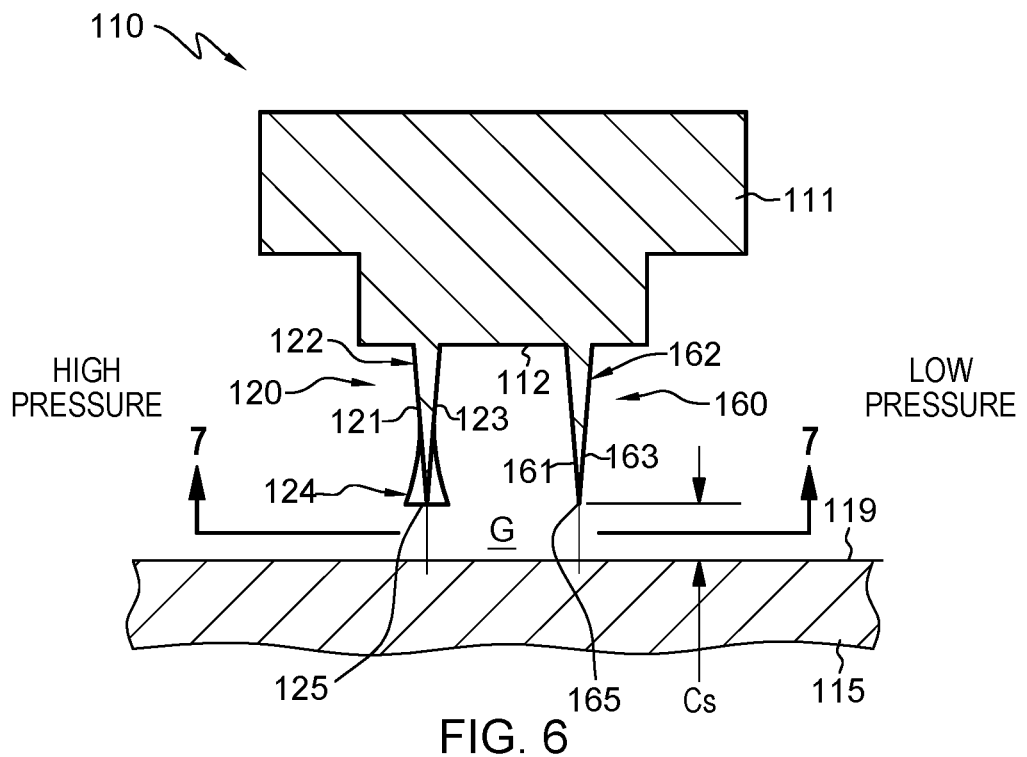
FIG. 6 is an enlarged cross-sectional view taken along line 6-6 in FIG. 5 of the contra-flow seal segment.
Figure 7:
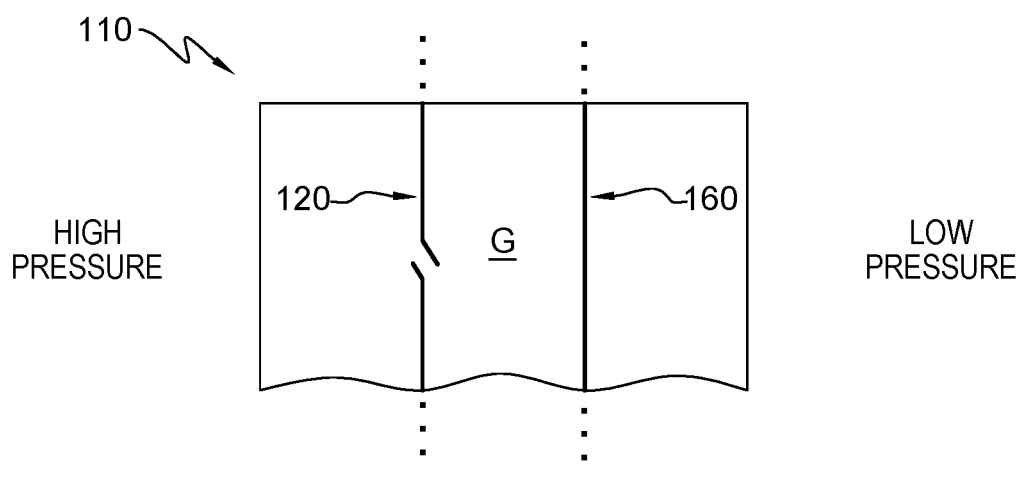
FIG. 7 is a view taken along line 7-7 in FIG. 6 of the contra-flow seal segment.

FIGS. 5-7 illustrate a contra-flow seal segment 110 according an embodiment of the present disclosure configured to return a portion of lower pressure downstream leakage of a portion of working fluid back upstream to a higher pressure region. For example, a plurality of contra-flow seal segments 110 may form contra-flow seal 101 (FIG. 4) and/or contra-flow seal 201 (FIG. 4) that encircles and may be oriented about a rotating member such as cover band 115 (FIG. 4) of blade row 116 (FIG. 4) or rotor 118 (FIG. 4), respectively. Contra-flow seal segment 110 may include a base portion 111, a discontinuous portion 120 extending from base portion 111, and a sealing strip portion 160 extending from base portion 111 and spaced apart from discontinuous portion 120. As described below, discontinuous portion 120 may be configured to provide means for generating a contra flow of a portion of a tangential flow of fluid in a low pressure region to a high pressure region between a stationary member and a rotating member. In some embodiments, a sealing strip portion need not be provided so that a base portion and a discontinuous portion may define a contra flow strip. In such embodiments, the base portion may have a cross-sectional thickness generally the same as a discontinuous portion.

Contra-flow seal segment 110 may be monolithic or integrally formed as a one-piece design or configuration. It will be appreciated that a plurality of contra-flow seal segments may be, for example, mounted in slots in a turbine casing or in a ring segment receivable in a slot of a diaphragm inner ring to form a contra-flow seal around a rotating member. Abutting portions of the ends of the contra-flow seal segments may be operably spaced apart to allow expansion and contraction of the contra-flow seal segments relative to each other due to temperature changes. In some embodiments, a contra-flow seal segments may be about 7 inches long. Depending to the design criterial, other sized and configured contra-flow seal segments may be employed.

As shown in FIG. 6, discontinuous portion 120 may include a first side surface 121, a second side surface 123, and a distal end 125 (FIGS. 5 and 6). Sealing strip portion 160 may include a first side surface 161, a second side surface 163, and a distal end 165 (FIGS. 5 and 6). A gap or channel G is defined between second surface 123 of discontinuous portion 120, an outer surface 112 of base portion 111, first side surface 161 of sealing strip portion 160, and an outer surface 119 of a rotating member such as cover band 115. For example, a plurality of contra-flow strip segments may define an annular channel extending around a rotating member.

With reference to FIGS. 5 and 6, discontinuous portion 120 may include an outer radial portion 122 and an inner radial portion 124. Sealing strip portion 160 may include a radial portion 162. As shown in FIG. 6, discontinuous portion 120 and sealing strip portion 160 may have a clearance Cs with respect to a rotating member such as outer surface 119 of cover band 115. For example, clearance Cs may be a nominal clearance of about 0.03 inch to about 0.07 inch between the distal ends of a contra-flow strip and a sealing strip, and a cover band. It will be appreciated that other suitable clearance values may be employed based on, for example, a turbine design.

Figure 8:
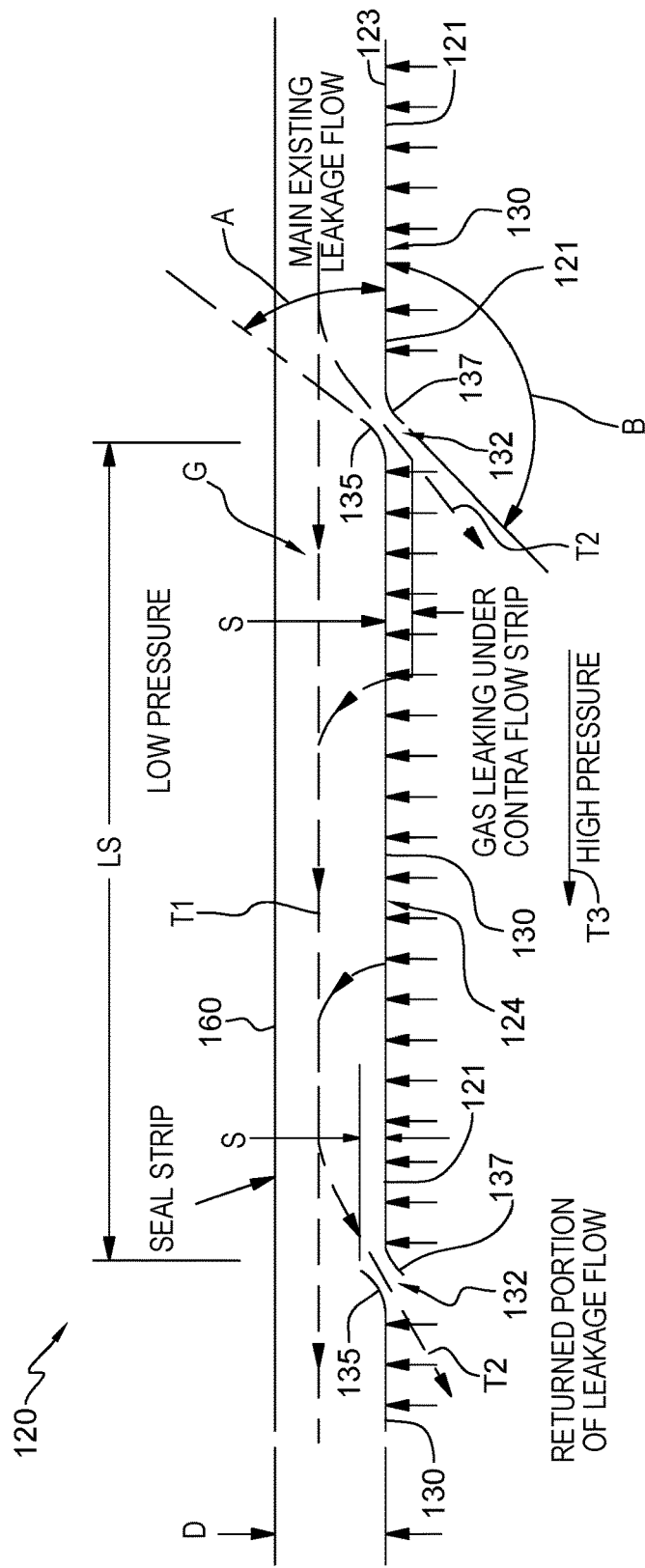
FIG. 8 is an unwrapped plan view of the contra-flow seal segment of FIG. 6 illustrating the flow of a portion of the working fluid.

With reference to FIGS. 5 and 8, discontinuous portion 120 may be spaced or pitched at a suitable axial distance D from sealing strip 160. Discontinuous portion 120 may include first deflecting members or portions 135 that extend a distance S (FIG. 8) outward from second side surface 123. It will be appreciated that distances D and S may be suitably determined based on the design of, for example, a turbine or compressor. Discontinuous portion 120 may be cut and deformed. For example, discontinuous portion 120 may be radially cut and bent to define spaced apart deflecting sections 130. Each section 130 may have a tangential length Ls (FIG. 8) and be placed at suitable tangential locations defining spaced apart openings or passageways 132 for the flow of fluid as described below. For example, deflecting sections 130 allow a portion of the tangential flow of downstream lower pressure fluid in channel G to be returned via passageways 132 to the upstream high pressure fluid flow ahead of discontinuous portion 120. Discontinuous portion 120 may have a prescribed number of sections or parts for directing fluid flow results in or achieving a reversal of flow of fluid flow from a low pressure region to a high pressure region.

As shown in FIG. 8, for example, a portion of the high upstream pressure fluid flow leaks under discontinuous portion 120 and into a tangential fluid flow T1 in channel G. A portion of the lower pressure tangential flow in channel G will be deflected by deflecting portions 135 of deflecting sections 130 extending from second side surface 123 that extend into axial channel G and into the upstream flow of the tangential fluid flow T1 in channel G. In particular, a portion of the lower pressure tangential flow T1 in channel G will be deflected by deflecting portions 135 back into the high pressure region in front of contra-flow strip 120. In other words, gas which flows under the contra-flow seal strip flows tangentially in the direction of the rotating member, and then as it approaches the contra-flow discontinuity, it is influenced by deflecting portions 135 and is forced to discharge a portion on the low pressure gas to flow into the high pressure region though passageways 132 and enter the high pressure region. This exhaust flow then reduces the quantity of gas in the channel G and so reduces the amount of gas available to leak past the remaining seal strips, and so reduces the gas leakage quantity.

For example, deflecting portions 135 of deflecting sections 130 may be generally curved or rounded having an inner radius and an outer radius as shown in FIG. 8. Curved or rounded deflecting portions 135 may aid in retaining the lamellar flow of the fluid. The deflecting portions 135 may be angled upstream into the tangential flow of fluid in the high pressure region may be generally described as being disposed on an angle, such as an angle A in FIG. 8, relative to second side surface 123 of about 10 degrees to about 80 degrees, about 10 degrees to about 60 degrees, about 10 degrees to about 30 degrees, about 30 degrees to about 60 degrees, about 10 degrees, about 20 degrees, about 30 degrees, about 45 degrees, about 60 degrees, or other suitable angle.

Discontinuous portion 120 may include deflecting sections 130 having second deflecting portions 137 spaced from deflecting portion 135 of deflecting sections 130. A portion of the high upstream pressure tangential fluid flow T3 adjacent to first side surface 121 will be deflected by deflecting portions 137 of deflecting sections 130 away from discontinuous portion 120 and allow receipt of deflected low pressure tangential fluid flow T2 through passageway 132. For example, deflecting portions 137 of deflecting sections 130 may be generally curved or rounded having an inner radius and an outer radius as shown in FIG. 8. Curved or rounded deflecting portions 135 may aid in retaining the lamellar flow of the fluid. Deflecting portions 137 may be angled downstream into the tangential flow of fluid in the low pressure region and may be generally described as being disposed on an angle, such as an angle B in FIG. 8, relative to first side surface 121 of about 100 degrees to about 170 degrees, about 100 degrees to about 150 degrees, about 10 degrees to about 120 degrees, about 120 degrees to about 150 degrees, about 120 degrees, about 135 degrees, about 150 degrees, or other suitable angle.

A result of the present disclosure may be that a net flow available to flow past the second seal strip, e.g., seal strip 160, will be reduced. The net flow of the remaining fluid after the return of a portion of the initial leakage, through the sealing device, including any remaining series strips will be reduced. This reduces the quantity of working fluid available to leak past the second seal strip (as well as subsequent sealing strips). The return of the recovered fluid to its original axial higher pressure location or region, ahead of the contra-flow strip, reduces the total leakage quantity available to leak past the sealing strip, and any further series sealing strips towards the exhaust from the sealing device. This reduced leakage quantity will then continue its leakage past the second conventional sealing strip, thereby reducing the total leakage quantity.

Figure 9:
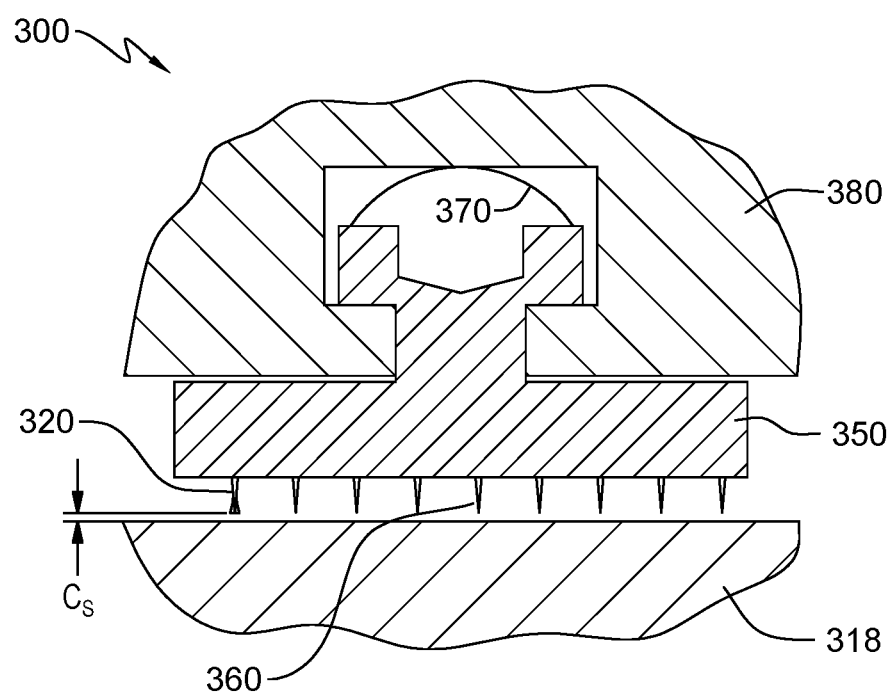
FIG. 9 is a cross-sectional view of a contra-flow seal according to an embodiment of the present disclosure.

FIG. 9 illustrates a contra-flow seal system 300 such as a steam seal or a gas seal incorporating a contra-flow strip 320 and a plurality of sealing strips 360 according to an embodiment of the present disclosure. A ring 350 may be mounted to stationary support 380 such as a casing or a packing head. Ring 350 may support contra-flow strip 320 and plurality of sealing strips 360. Ring 350 may encircle a rotating member 310 such as a rotor. A spring 370, which may be coil spring, biases ring 350 toward rotating member 310. The contra-flow strip and the sealing strip may be received in slots formed in the ring. For example, a base portion of the contra-flow strip may be held in place by deforming spaced apart inner surface portions of the ring. A base portion of the sealing strips may be held in place by deforming spaced apart inner surface portions of the ring. Contra-flow strip 320 and plurality of sealing strip 360 may have a clearance Cs with respect to rotating member 318. Clearance Cs for inner diaphragm seals may be less than about 0.07 inch between the distal ends of contra-flow strip and sealing strip and a rotor, and may be a nominal clearance of about 0.025 inch to 0.04 inch between the distal ends of contra-flow strip and sealing strip and a rotor. It will be appreciated that other suitable clearance values may employed based on, for example, a turbine or compressor design.

From the present disclosure, it will be appreciated that a contra-flow strip may be employed in conjunction with any portion of a rotating member of a turbine such as a blade row, a rotor, or other portion, and may be used in conjunction with any of the commonly known seal configurations as described above, including multiple seal segments and multiple ring seals. The contra-flow strip may be used in conjunction with seals in which extend radially inward toward a rotating member, radially outward from a rotating member, or both.

With respect to the illustrated contra-flow strips, it is noted that the discontinuous portions need not be defined by a deflecting portion having deflecting portions, but rather other suitable configurations may be employed that provide a portion of the leakage from a high pressure region that passes the contra-flow strip and disposed in a lower pressure region to be returned upstream ahead of the contra-flow strip to the higher pressure region. With respect to the illustrated contra-flow strips, it is noted that the discontinuous portions need not be defined by discontinuous portion having both opposite deflecting portions, but rather other suitable configurations may be employed having only deflecting portions that provide a portion of a tangential flow from the low pressure region to be deflected back across the contra-flow strip to the high pressure region. Similarly it is noted that a contra-flow strip including means for returning fluid from a low pressure region back across the contra-flow strip need not be of the illustrated single contra-flow strip design, but could include a plurality of parallel contra-flow strips, or a plurality of contra-flow strips and one or more sealing strips. Those of ordinary skill in the art will be aware of other embodiments which may be employed without departing from the scope of the disclosure as defined in the following claims.

Figure 10:
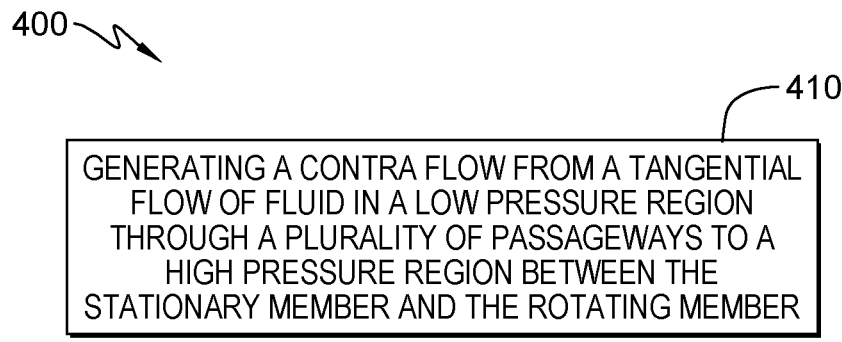
FIG. 10 is a flowchart of a method for inhibiting leakage of fluid between a stationary member and a rotating member according to an embodiment of the present disclosure.

FIG. 10 illustrates a method 400 for inhibiting leakage of fluid between a stationary member and a rotating member according to an embodiment of the present disclosure. In this illustrated embodiment, method 400 may include at 410 generating a contra flow from a tangential flow of fluid in a low pressure region through a plurality of passageways to a high pressure region between the stationary member and the rotating member. The method may further include deflecting a portion of a tangential flow of the fluid in the high pressure region away from the plurality of passageways.

Figure 11:
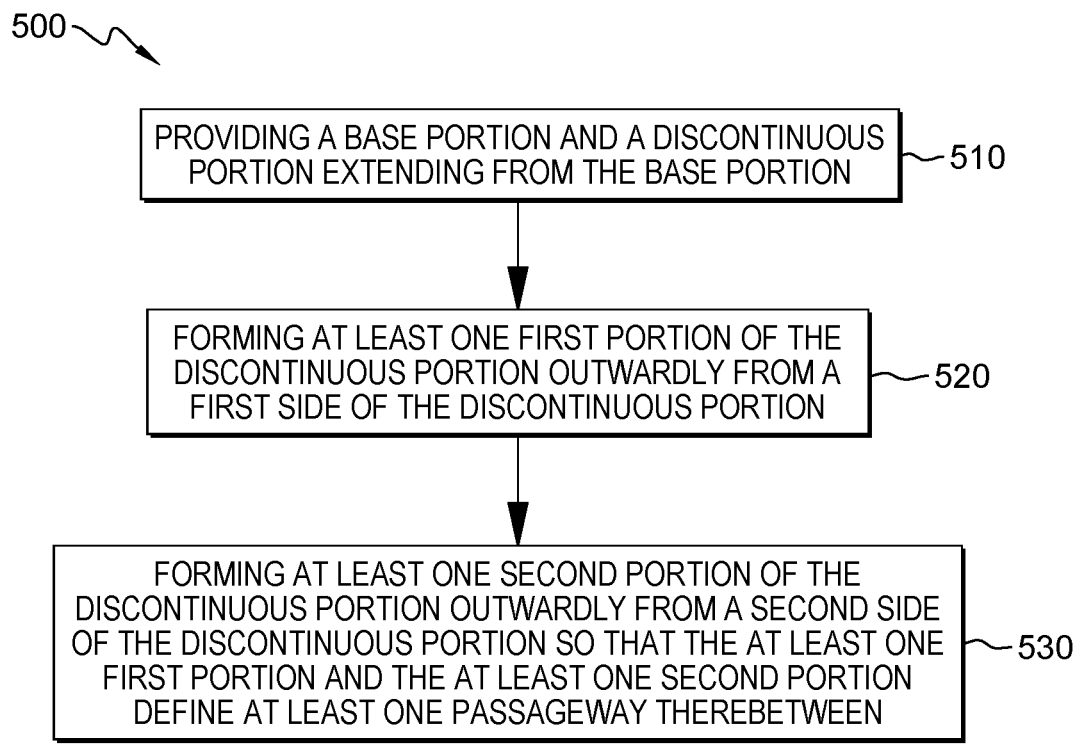
FIG. 11 is a flowchart of a method for producing a contra-flow strip segment according to an embodiment of the present disclosure.

FIG. 11 illustrates a method 500 for producing a contra-flow strip segment according to an embodiment of the present disclosure. In this illustrated embodiment, method 500 may include at 510 providing a base portion and a discontinuous portion extending from the base portion, at 520 forming at least one first portion of the discontinuous portion outwardly from a first side of the discontinuous portion, and at 530 forming at least one second portion of the discontinuous portion outwardly from a second side of the discontinuous portion so that the at least one first portion and the at least one second portion define at least one passageway therebetween. The method may further include providing a solid sealing strip segment extending radially from the base portion and spaced from the first strip segment to define a channel therebetween. The forming may include bending and the contra-flow strip segment may be a monolithic structure.

It is to be understood that the above description is intended to be illustrative, and not restrictive. For example, the above-described embodiments and/or aspects thereof may be used in combination with each other. In addition, many modifications may be made to adapt a particular situation or material to the teachings of the various embodiments without departing from their scope.

While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions, or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

This written description uses examples in the present disclosure, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A contra-flow strip segment for use in inhibiting leakage of a fluid between a rotating member and a stationary member, said contra-flow seal segment comprising:
   a base portion operably supportable from the stationary member; and
   a discontinuous portion extendable from said base portion towards the rotating member between a low pressure region and a high pressure region, said discontinuous portion comprising:
      at least one first deflecting portion operable to direct a portion of a tangential flow of fluid in the low pressure region through at least one passageway in said discontinuous portion to the high pressure region;
      at least one second deflecting portion operable to direct a tangential flow of fluid in the high pressure region away from the at least one passageway in said discontinuous portion; and
      wherein said at least one first deflecting portion is angled downstream into the tangential flow of fluid in the low pressure region, and said at least one second deflecting portion is angled upstream into the tangential flow of fluid in the high pressure region.

2. The contra-flow strip segment of claim 1 wherein said at least one first deflecting portion and said at least one second deflecting portion are disposed side-by-side.

3. The contra-flow strip segment of claim 2 wherein said at least one first deflecting portion is generally parallel to said at least one second deflecting portion.

4. The contra-flow strip segment of claim 1 further comprising a sealing strip portion extendable from said base portion to define a channel portion between said discontinuous portion, said sealing strip portion, said base portion, and a portion of the rotating member, said channel portion operable for containing the low pressure region, and wherein the at least one first deflecting portion is operable to direct the portion of the tangential flow of fluid in the low pressure region in the channel through the at least one passageway in said discontinuous portion to the high pressure region.

5. The contra-flow strip segment of claim 4 wherein said at least one first deflecting portion and said at least one second deflecting portion are disposed side-by-side.

6. The contra-flow strip segment of claim 4 wherein said at least one first deflecting portion is generally parallel to said at least one second deflecting portion.

7. The contra-flow strip segment of claim 4 wherein said contra-flow seal segment comprises a monolithic structure.

8. The contra-flow strip segment of claim 4 wherein said at least one passageway opens onto a distal edge of said discontinuous portion adjacent to the rotating member.

9. The contra-flow strip segment of claim 4 further comprising a turbine or a compressor containing said contra flow seal segment.

10. The contra-flow strip segment of claim 1 wherein said contra-flow seal segment comprises a monolithic structure.

11. The contra-flow strip segment of claim 1 wherein said at least one passageway opens onto a distal edge of said discontinuous portion adjacent to the rotating member.

12. The contra-flow strip segment of claim 1 further comprising a turbine or a compressor containing said contra flow seal segment.

13. A method comprising:
   providing a plurality of the contra-flow strip segments of claim 1 disposed coaxially between the stationary member and the rotating member; and
   generating the contra flow of the portion of the tangential flow of fluid in the low pressure region to the high pressure region.

14. A method comprising:
   providing a plurality of the contra-flow strip segments of claim 1 disposed coaxially between the stationary member and the rotating member;
   generating the contra flow of the portion of the tangential flow of fluid in the low pressure region to the high pressure region; and
   deflecting the portion of the tangential flow of fluid in the high pressure region away from the low pressure region.

15. A method comprising:
   providing a plurality of the contra-flow strip segments of claim 4 disposed coaxially between the stationary member and the rotating member;
   generating the contra flow of the portion of the tangential flow of fluid in the low pressure region in the channel to the high pressure region; and
   deflecting the portion of the tangential flow of fluid in the high pressure region away from the low pressure region.

16. A method comprising:
   providing the contra-flow seal segment of claim 4 disposed between the stationary member and the rotating member;
   generating the contra flow of the portion of the tangential flow of fluid in the low pressure region in the channel to the high pressure region.

* * * * *